(12) United States Patent
Inglett

(10) Patent No.: US 7,943,766 B2
(45) Date of Patent: May 17, 2011

(54) LOW-CARBOHYDRATE DIGESTIBLE HYDROCOLLOIDAL FIBER COMPOSITIONS

(75) Inventor: George E. Inglett, Peoria, IL (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 403 days.

(21) Appl. No.: 12/075,564

(22) Filed: Mar. 12, 2008

(65) Prior Publication Data

US 2008/0160144 A1    Jul. 3, 2008

Related U.S. Application Data

(63) Continuation of application No. 11/020,349, filed on Dec. 22, 2004, now abandoned.

(51) Int. Cl.
*C07H 1/06* (2006.01)
*C07H 1/08* (2006.01)

(52) U.S. Cl. ......................... 536/128; 536/127

(58) Field of Classification Search .................. None
See application file for complete search history.

(56) References Cited

U.S. PATENT DOCUMENTS

| | | | | |
|---|---|---|---|---|
| 4,028,468 A | * | 6/1977 | Hohner et al. | 426/436 |
| 5,106,640 A | * | 4/1992 | Lehtomaki et al. | 426/436 |
| 6,060,519 A | * | 5/2000 | Inglett | 516/77 |

* cited by examiner

*Primary Examiner* — Layla Bland
(74) *Attorney, Agent, or Firm* — Randall E. Deck; John Fado; Lesley Shaw

(57) ABSTRACT

A novel low-carbohydrate digestible hydrocolloidal composition is separated from a cereal-based substrate by means of a specific sequence of steps for treating an aqueous slurry of the substrate. These all-natural compositions are low in digestible carbohydrates, principally starches, and rich in soluble fiber, principally β-glucan, as well as proteins. The hydrocolloidal products are recovered in high yields, are smooth in texture, have unexpected thickening properties, have a bland flavor, and are useful for texturizing food, especially bakery products. These hydrocolloidal products can also be used as food ingredients for increasing the nutritional level of foods and supplements.

18 Claims, 2 Drawing Sheets

LOW-CARBOHYDRATE DIGESTIBLE HYDROCOLLOIDAL FIBER COMPOSITIONS

BACKGROUND OF THE INVENTION

1. Field of the Invention

This invention relates to the separation of digestible carbohydrate components from the indigestible carbohydrate components of oat, barley, or combinations of grain products and also relates to conversion of these components to cereal hydrocolloidal soluble fiber and protein-enhanced compositions that are useful as texturizers and nutrients for improving the health benefits of foods.

Cereal grains contain large quantities of digestible starch along with proteins, lipids, ash, and indigestible components. The indigestible components are called dietary fibers that are the soluble and insoluble components of cell walls. They are resistant to endogenous digestion in the human upper digestive tract [*Am. J. Clin. Nutr.*, 25: 464-465 (1972)]. Such fibers consist primarily of cellulose, hemicellulose, pectin substances, oligosaccharides, lignin, gums and mucilages and have been an important food component since early times. Diets containing significant amounts of dietary fiber are known to assist in the digestive process and contribute to improved health. Burkitt et al. [*Lancet*, 2: 1408-1411 (1972)] teach that dietary fiber has a role in the prevention of certain large-intestine diseases, including cancer of the colon and diverticulitis. Burkitt et al. also indicate that serum cholesterol rises when dietary fiber is removed from the diet, and that eating a fiber-rich diet lowers serum cholesterol. Trowell [*Am. J. Clin. Nutr.*, 25: 464-465 (1972)] and Dreher [Handbook of Dietary Fiber, An Applied Approach, Marcel Dekker, Inc., New York, N.Y. (1987)] have reported on similar conclusions regarding the relationship between fiber and health benefits.

It is now known that soluble and insoluble fibers provide different health benefits. For example, wheat bran is very rich in insoluble crude fiber (mainly cellulose and hemicelluloses) and is excellent for decreasing the transit time of food through the digestive tract [Anderson et al., *Am. J. Clin. Nutr.*, 32: 346-363 (1979)]. Some soluble fibers, especially β-glucan, are reported to reduce total plasma cholesterol [Behall et al., *J. Am. Coll. Nutr.*, 16: 46-51 (1997)].

Diet has been recognized as a major factor in diabetes mellitus treatment since the discovery of insulin. Over many years, the calorie contributing components in the diet have shifted among the portions of digestible carbohydrates, proteins, and fat. Early recommendations were to limit dietary digestible carbohydrates. These low-carbohydrate diets with high-fat, mainly saturated fats, were associated with dyslipidemias and cardiovascular disease. More recently, the American Diabetes Association (ADA) recommended a diet in which protein contributes 10% to 20% of the total calories. The ADA recommends that saturated fat should contribute less than 10% of total calories, and polyunsaturated fat contributing no more than 10% of total calories, with the remainder of fat calories coming from monounsaturated fat. Fiber intake is recommended to be approximately 20 to 35 g/day.

There is a need in the art for a dietary fiber food ingredient with decreased carbohydrate (particularly starch) digestible components that is functionally useful in foods and acts to delay the absorption curve of digestible carbohydrates after a meal. The ingredient should be capable of being easily incorporated into food products without interfering with taste and texture. The functional properties of the ingredient should have about the same rheological qualities as the original starting material with its higher starch component. It is also important in the art to provide nutrients for several health benefits including heart diseases and diabetes Type 2.

2. Description of the Prior Art

Dietary fiber typically consists of morphologically intact cellular tissues of various seed brans, hulls, and other agricultural by-products that have a high content of crude fiber [Dintzis et al., *Cereal Chem.*, 56:123-127 (1979)]. When added to foods, these fibers impart a gritty texture to the final product. One solution to this problem has been to grind the fibers to give finer powders, but these powders still lack smooth hydrocolloidal character. Also, the alkaline or alkaline/peroxide treatment of agricultural byproducts as reported by Gould (U.S. Pat. Nos. 4,649,113 and 4,806,475), Gould et al. (U.S. Pat. No. 4,774,098), Ramaswamy (U.S. Pat. No. 5,023,103); and Antrim (U.S. Pat. No. 4,038,481) does not remove the crude fiber components but completely eliminates the soluble fiber components. Morley et al. (U.S. Pat. No. 4,565,702) and Sharma (U.S. Pat. No. 4,619,831) teach enrobing the high crude fiber insoluble dietary fibers with soluble fibers (gums) for providing better texture and mouth feel.

Soluble fibers are water-soluble polysaccharides such as pectin-like fruit and beet by-products (Thibault et al., U.S. Pat. No. 5,275,834). There have been a number of reports of alkaline extraction of agricultural materials, including hulls and brans, for obtaining their soluble hemicellulose components (Wolf, U.S. Pat. No. 2,709,699; Rutenberg et al., U.S. Pat. No. 2,801,955; and Gerrish et al., U.S. Pat. No. 3,879,373).

Gould et al., U.S. Pat. No. 4,497,840, describe foods made from oat bran which contains at least 150% more crude fiber than whole oat flour. Also, Murtaugh et al., U.S. Pat. No. 4,908,223, show grinding oat bran and rice products to make frozen desserts without any separation of crude fiber components. Rudel, U.S. Pat. No. 4,961,937, also used non-separated oat products in baked products.

The oat soluble fiber, also called oat gum or β-glucan, of the oat groat was fractionated as a separate component by an extensive series of separation described by Hohner and Hyldon, U.S. Pat. No. 4,028,468. Another wet-milling of oats to give various fractions including oat proteins was described by Cluskey et al. [*Cereal Chem.*, 50:475 (1973)]. Also β-glucan enriched cellulose-containing fiber with little starch was described by Lehtomaki et al., U.S. Pat. No. 5,183,677. Oat β-glucan was water-extracted from oat groat in U.S. Pat. No. 5,512,287 by Wang et al. Also, barley β-glucan was purified by an alkaline extraction procedure of Bhatty (U.S. Pat. No. 5,518,710).

U.S. Pat. No. 4,028,468 to Hohner et al. (1977) outlines a method to extract β-glucan from oat groat. Groats are hulled, usually crushed grain, especially oats. According to Hohner et al., oat groat is flaked, the oil extracted, dried, ground and air classified to produce a coarse milling fraction. The extraction of β-glucan includes mixing the coarse fraction with water, adjusting the pH twice, chilling the water extract to 4° C., and drying recovered β-glucan in a vacuum dryer. The multiple pH adjustments, the use of oil extraction, air classification and vacuum drying are expensive processing steps which make the invention economically disadvantageous from a commercial production point of view. High purity β-glucan fractions, (over 50 percent pure β-glucan) were not reported using this technique.

U.S. Pat. Nos. 4,804,545 (1989) and 5,013,561 (1991), both to Goering et al., outline a method for extracting β-glucan from waxy barley grain. Waxy barley grain is ground and mixed with water, centrifuged to remove bran and starch, boiled to destroy the activity of β-glucanase, centrifuged to remove the coagulated protein which contains a high percentage of oil, and the extract passed through an ultrafilter to purify the β-glucan. The β-glucan solids are dried on a drum dryer or a spray dryer. Recovering the solids using this technique with a drum dryer or a spray dryer produces a light yellowish-brown-colored product with a purity of β-glucan less than 50 percent by weight of the product. These two inventions produce β-glucan products with undesirable β-glucan purity and low molecular weights.

U.S. Pat. Nos. 5,106,640 (1992) and 5,183,677 (1993) both to Lehtomaki et al., describe a method for producing a β-glucan-enriched alimentary fiber from oats and barley. Barley or oat grains are dehulled, optionally ground and slurried in water at about 8° C. with ethanol addition. The slurry is screened and a product is collected. The product contains 15-40 percent β-glucan and about equal amounts of starch and protein. This invention does not produce a β-glucan product having a purity of more than 50 percent by weight of the product.

U.S. Pat. No. 5,512,287 by Wang et al. teaches a method of recovering β-glucan as a white-colored powder containing about 75 percent of the naturally occurring β-glucan in cereal grains with molecular weights of the β-glucan ranging between 400,000 daltons to 2,000,000 daltons.

Potter et al. (U.S. Pat. No. 6,485,945) found that an all aqueous system using ultrafiltration gave solids with high soluble β-glucan contents. Also, when an aqueous solution was heated in an open vessel such as tray evaporator, a thin, solid film, or "skin", spontaneously formed on the surface of the liquid that was predominantly P-glucan and separated out from a very dilute β-glucan solution.

Previous processes for concentrating soluble β-glucan from cereals such as oats or barley, have been considered to be impractical for application to commercial manufacturing processes because of high cost of processing the high-viscosity, low-concentrations of oat or barley grain solids in aqueous solution. The reliance upon a water-miscible solvent, such as ethanol or isopropanol, to precipitate soluble β-glucan from aqueous solutions by these solvents, entails high in-process losses and difficult reclamation. The low solid contents of the aqueous solutions require huge amounts of solvent for precipitation. If the solids concentration could be elevated, considerable saving could be made.

Inglett (U.S. Pat. No. 4,996,063) teaches that water-soluble dietary fiber compositions are prepared by treatment of milled oat products with α-amylase and removal of insoluble components by centrifugation. In a related development, Inglett (U.S. Pat. No. 5,082,673) teaches that a soluble dietary fiber and maltodextrin-containing product is prepared by hydrolyzing a cereal flour or a blend of cereal flour and starch with an α-amylase. This soluble fiber composition has been described for use in ready-to-eat cereal (Smith and Meschewski, U.S. Pat. No. 5,275,831) and low fat comminuted meat products (Jenkins and Wild, U.S. Pat. Nos. 5,294,457 and 5,585,131).

Also, U.S. Pat. No. 6,060,519 by Inglett discovered a novel class of hydrocolloidal compositions recovered from the liquid fraction obtained by subjecting oat or barley substrates to a heat-shearing treatment. These compositions contain soluble fiber, principally β-glucan, and are substantially free of insoluble fiber particles. The hydrocolloidal products are smooth in texture and display the properties of a dairy cream, coconut cream, or fat imitation on rehydration. They are recovered in about 70-95% yields.

Cahill et al. (U.S. Pat. No. 6,531,178) found that high levels of β-glucan from oat or barley grains could be extracted from an aqueous solution using various pH adjustments at around 6% oat slurry in order to carryout the extraction procedure at temperatures below the gelatinization of starch. Their soluble β-glucan products could be agglomerated for use in foods, and have approximately 50% available carbohydrate content.

Malkki and Myllymaki (U.S. Pat. No. 5,846,590) found that trypsin in a mild treatment of oat products with a proteolytic enzyme leads to an elevation of viscosity of β-glucan of certain varieties. This effect was accentuated by subsequent thermal, solvent and mechanical treatments that resulted in an enrichment of dietary fibers.

SUMMARY OF THE INVENTION

I have now invented a novel class of low-carbohydrate digestible hydrocolloidal compositions by separating them from an aqueous slurry of a cereal substrate, preferably oat and/or barley grain, without pH modifications. These all-natural compositions are low in digestible carbohydrates, principally starches, and rich in soluble fiber, principally β-glucan. They are also rich in proteins. The hydrocolloidal products are recovered in high yields, are smooth in texture, and are characterized by properties suitable for texturizing food, especially bakery products. These hydrocolloidal products can also be used as food ingredients for increasing the nutritional level of foods and supplements.

In accordance with this discovery, it is an object of the invention to provide hydrocolloids that are smooth in texture, low in starchy carbohydrates, and rich in β-glucans and proteins with sensory properties that render them suitable for a wide-range of food applications.

It is also an object of the invention to provide a method for isolating the aforementioned hydrocolloids from cereal substrates, especially from oat and barley.

Another object of the invention is to provide a hydrocolloidal composition having a low carbohydrate content and a relatively high β-glucan content without the addition of chemicals to change the pH function.

A further object of the invention is to decrease the digestible carbohydrate content of a food product while increasing its soluble β-glucan content without the use of unnatural additives in the processing operation.

Still another object of the invention is to extend the viscoelastic properties of the subject hydrocolloids by demonstrating their unexpected thickening effects despite their decreased digestible carbohydrate contents.

Yet another object of the invention is to yield hydrocolloids having an unexpectedly bland taste and other favorable sensory properties and to impart these properties to co-processed compositions with other food products.

Other objects and advantages of the invention will become readily apparent from the ensuing description.

DETAILED DESCRIPTION OF THE INVENTION

Any cereal grain with a soluble fiber component therein may be used as a starting material in the present invention.

Cereal grains, including wheat, rice, rye, corn, sorghum and millet, have a relatively low concentration of β-glucan. Oats and barley are preferred because of their higher levels of naturally-occurring soluble fiber component. Oat grain has about 4% soluble fiber, β-glucan, on a dry weight basis (dwb), while the β-glucan content of barley grain can vary from about 5 to 15%, dwb.

Any processed grain product may likewise be utilized as a starting material in the present invention including cereal flour, cereal flakes, cereal bran, defatted grain, and mixtures of grains including grain flour or grain fractions. Methods for grinding oat groat to separate the bran layers from the endosperm giving whole oat flour and oat bran flour are commonly known in the art. Oat bran flour, for example, may contain up to 12% β-glucan, dwb.

Figure 1:
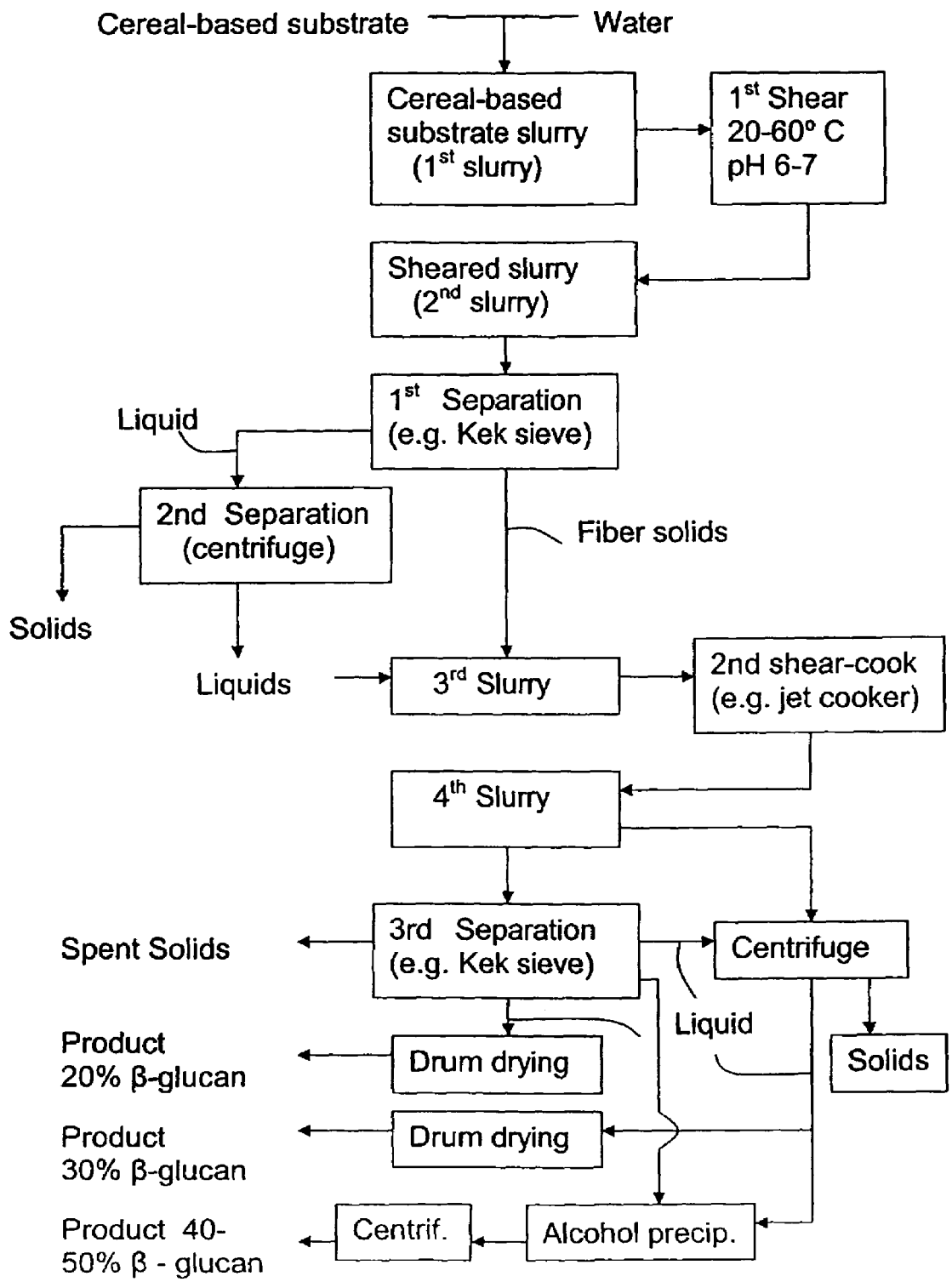
FIG. 1 is a flow diagram depicting the steps of the process of the invention.

As shown in FIG. 1, the extraction process of the present invention begins by forming a first aqueous slurry of grain material at a concentration of about 5 to 30% by weight. A critical element of the process of the invention is in providing adequate physical disruptive forces to the cereal-based substrate in order to break down the cellular structures of the substrate. Accordingly, the cereal-based substrate slurry is subjected to shear forces in an initial treatment sufficient to yield a flowable liquid slurry (second slurry) capable of being separated into a liquid fraction and a fiber (bran)-containing solid fraction. It is desirable to conduct the initial shear treatment at temperatures in the range of about 20-60° C., and preferably in the range of about 30-50° C., more preferably at a temperature of approximately 50° C. The requisite time period of treatment will, of course, vary with the starting substrate, the nature of the shear apparatus, and other conditions of treatment; but the period will typically be on the order of about 1-120 minutes, and more typically 30-120 minutes. It is preferred to have an initial viscosity of the first slurry of less than 20 poise (P) at temperatures in the range of 20-60° C. in order to pump the liquid continuously through shear devices necessary for cellular disruptions throughout the treatment and recovery process. Typically, the pH of the slurry is between 6 and 7, and does not require adjustment.

The forces for mechanically shearing the cereal-based substrate in the initial treatment are provided by a variety of shearing devices, such as dispersator, colloid mill, Waring™ blender, extruder, homogenizer, shear pump or the like. Exemplary of these is a Bostonshear three stage pump.

The insoluble fiber solids are separated in a first liquid-solid separation step by any means as known in the art, such as on rapidly vibrating sieves or centrifugal sieves with openings between 80 to 500 mesh sieve (210-25 microns; 0.21-0.025 mm), with an opening size of 100-mesh being preferred. Suitable for use herein is a Kek-Gardner centrifugal sifter. Both the fiber-containing solids fraction and the liquid fraction are recovered from the first separation step. The collected fiber solids are reserved for recombining with the liquid fraction obtained from the second liquid-solid separation step, as described, below.

The liquid fraction from the first liquid-solid separation step is enriched in starch as compared to the sheared slurry. This liquid is then subjected to a second liquid-solid separation, such as centrifugation or decantation, to remove any remaining solids. These solids are predominantly starch. If a centrifuge is used, the most suitable centrifugation forces (RCF) are between about 50 and 15,000×g. The starch-depleted liquid fraction from the second liquid-solid separation step is then recombined with the saved fiber solids obtained from the first liquid-solid separation to yield a third slurry.

The third slurry is then subjected to heat and shear in a cooking step. A preliminary stage of this step may consist of circulating the slurry through a shear pump at elevated temperatures, such as 38-93° C. (100-200° F.). The substantive shear-cook stage is optimally provided by a continuous steam jet cooker, particularly excess steam jet-cooker [see R. E. Klem and D. A. Brogley, Pulp & Paper, Vol. 55, pages 98-103 (May 1981)] over a period of 5 to 30 min. As previously mentioned, the viscosity of the resultant cooked cereal slurry should be maintained at less than 20 Poises in order to have the requisite flowability through the cooker and for subsequent processing.

Although jet cooking conditions may be varied by one skilled in the art according to the particular cereal substrate being processed, preferred cooking conditions for these compositions are in the range of about 120-150° C. with a steam pressure of at least 1.4 bar (20 psig) within the cooker and a pumping rate of about 0.75-2.0 l/min. Typical conditions are 130-140° C. with a steam pressure of at least 5.2 bar (75 psig) and a pumping rate of 1.1 l/min. Line pressure steam entering the cooker to achieve such conditions would be 5.5-6.9 bar (80-100 psig). Thus the excess steam flowing through the cooker, over and above that needed to maintain the desired cook temperature, should be at least about 1 bar (15 psig), and preferably in the range of 1.7 bar (25-30 psig). Under these conditions, sufficient turbulence is provided in the cooker to substantially disrupt the remaining solids and to release the β-glucan into the slurry. The high steam pressure used during the cooking process is suddenly released as the cooked dispersion exits the jet cooker. This instantaneous pressure release further promotes the physical disruption and/or molecular degradation of the fibrous material. At the time of the pressure release, the temperature of the cooked slurry (fourth slurry) rapidly drops to 100° C. (212° F.) or lower.

After heating and shearing, β-glucan-containing products of the invention are recovered from the cooked slurry (fourth slurry). For example, the cooked slurry may be subjected to a third liquid-solid separation, such as by centrifugation filtration or on vibrating sieves having openings in the range of 210-25 microns. The crude fiber particle solids removed by this separation step are characterized by a β-glucan content of approximately 6-8%, dwb, and for purposes of the invention are considered to be a by-product. The flowable liquid fraction from the third separation step is subjected to further recovery steps to yield the hydrocolloidal product of the invention. For example, the liquid fraction may be dried by conventional methods, including drum drying, spray drying, freeze drying, hot-air, and the like. In a commercial operation, drum drying would be considered a preferred embodiment. Alternatively, the liquid from the third separation may be passed through a centrifuge to remove suspended solids. The remaining liquid fraction is then either dried directly as described above, or is subjected to further processing, such as alcohol precipitation and a final centrifugation prior to drying. Drum-drying the liquid obtained directly from the third separation step will yield a product having at least about 20% β-glucan, dwb. Drum-drying the liquid obtained directly from centrifugation of liquid from the third separation step will yield a product having at least about 30% β-glucan, dwb. A dried product obtained from alcohol precipitation of the centrifugation liquid will have a β-glucan content of at least about 40-50%, dwb. Alcohol precipitation of the liquid from the third separation without centrifugation will yield a product having a β-glucan content of 35-40%, dwb. The products of the invention are readily dispersible in water to give a high viscosity creamy fluid.

Figure 2:
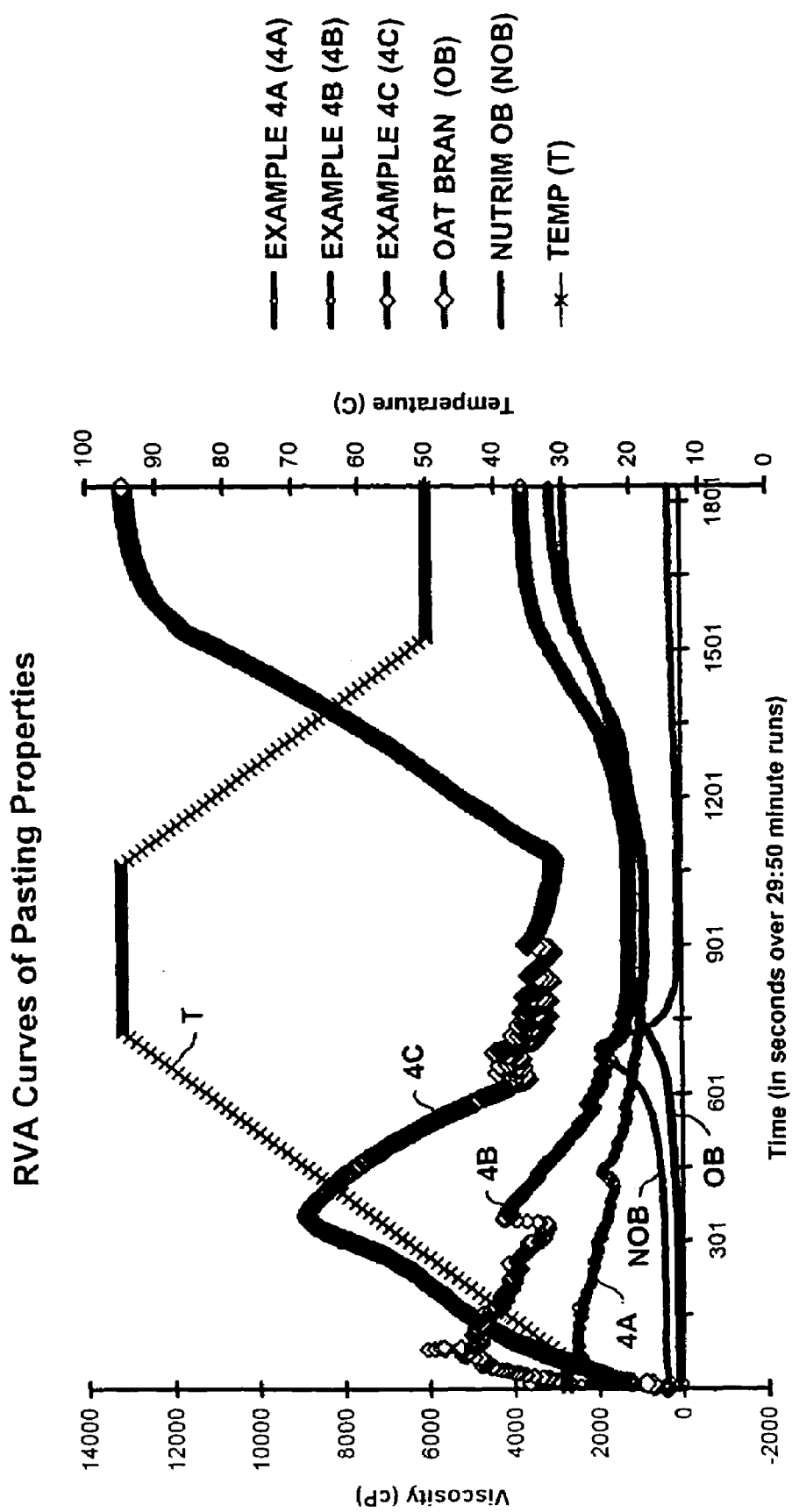
FIG. 2 is a graph depicting a series of Rapid Visco-Analyzer (RVA) curves for three products of the invention described in Examples 4A, 4B and 4C in comparison with an oat bran starting material and with a material produced by a prior art method (Nutrim OB, U.S. Pat. No. 6,060,519). The curves show the change in viscosity as temperature is changed over a period of time.

The products of the invention are hydrocolloids that have "thermo-shear-thinning" properties. These properties are evident in aqueous dispersions of the hydrocolloids, which are characterized, for example, by viscosities that are substantially higher than those manifest by the products taught by Inglett et al., U.S. Pat. No. 6,060,519. As shown in FIG. 2, the hydrocolloids of the invention display pasting properties that are considerably distinct as compared to those for the product (Nutrim OB) described in U.S. Pat. No. 6,060,519, supra, and as compared to the oat bran starting material. The Rapid Visco-Analyzer (RVA) curves of FIG. 2 show viscosities for the hydrocolloids of the invention that are significantly higher than for Nutrim OB and the oat bran starting material, particularly in the 200- to 450-second region and also in the 1200- to 1800-second region. The 200- to 450-second region is within the initial RVA heating cycle, that is, during that part of the heating cycle before which the maximum heating temperature is attained and the subsequent cooling (or gelling) cycle begins. In a standard RVA analysis, the hydrocolloid is made up as an 8% w/w aqueous suspension and is then heated at a uniform rate from an initial equilibrated temperature (e.g. 30° C.) to a preselected maximum temperature, usually exceeding 90° C. After holding the paste for a period of time at the maximum temperature, the temperature is gradually decreased at a uniform rate to some predetermined plateau (e.g. 50° C.). This cooling period is referred to as the gelling cycle. The hydrocolloids of the invention having at least about 20% β-glucan, dwb, are characterized by a viscosity greater than 1000 centipoises when initially heated to 40° C., and perhaps greater than, 1500, 2000, or even 2500 centipoises. Generally, the higher the β-glucan content, the higher the viscosity. Hydrocolloids having 50% β-glucan, dwb, are characterized by viscosities of approximately 4000 centipoises at 40° C. when initially heated. The aforementioned viscosity values correspond to approximately 4 minutes in the initial heating cycle in the RVA program shown in FIG. 2.

The hydrocolloids of the invention are also unique in terms of having a ratio of digestible starch to β-glucan soluble fiber of 2.0 or less, and typically in the range of 0.1-2.0. For instance, Table 1 lists the ratios of digestible starch to β-glucan of the subject hydrocolloids in comparison with the starch to β-glucan ratios of oat bran starting material and the Nutrim-OB product described in U.S. Pat. No. 6,060,519. The digestible carbohydrate content for the values given in the table was measured by standard methods for total starch analysis (AACC Method 76-13). The β-glucan contents were measured by a standard procedure (AACC Method 32-23).

The smooth textured hydrocolloids of the invention are suitable as ingredients in preparing low carbohydrate and low fat foods without imparting undesirable cotton-like or dry mouthfeel, or a sandy, bulky, chalky, or gritty texture characteristic of most dietary fiber materials. The hydrocolloids of the invention can be used as ingredients in a variety of food products, particularly in baked goods and desserts. They are especially suitable in baked goods as replacements of a portion of the fat and/or replacement of a portion of the flour. Such replacements result in an elevation in the food of the soluble fiber, β-glucan, with acceptable textural qualities, including moistness. The hydrocolloids of the invention are also useful as nutritional supplements in nutrition bars, weight loss bars, beverages, smoothies, soups, pancake mixes and the like. The level of incorporation of the hydrocolloid into a food composition may be within the range of 0.1-99%, by weight. It is further envisioned that the products of the invention can be prepared in essentially pure form as recovered from any of the aforementioned processes for administration as a oral supplement, such as in capsular form, or as a powder or granule for sprinkling over a food product at the time of consumption.

The following examples are presented only to further illustrate the invention and are not intended to limit the scope of the invention which is defined by the claims.

All references disclosed herein or relied upon in whole or in part in the description of the invention are incorporated by reference.

Example 1

Oat Bran (OBC), 100 lb (45 kg, QUAKER Oats Company, Chicago, Ill., Lot No. 26629; MAR 13, 2003) was mixed with 1900 lb (862 kg) of water [8.345 lb/gal or 228 gallons] and heated to 105° F. (41° C.) in a mixing tank and circulated with a Bostonshear pump with a three stage head for 1 hour. The solids were removed using a Kek-Gardner centrifugal sifter with a 200 mesh sieve. After collecting 100 gals (379 L) of liquid, another 75 gals (284 L) were added to the mixing tank and the circulation continued passing the slurry through the 200 mesh sieve until 150 gal (568 L) of sieve liquid was obtained. The liquid from the sieve (DD2-SL-1) was centrifuged to separate the solid carbohydrate particles. The centrifuge liquid (DD2-SL-CL1) was mixed with the separated wet sieve solids (DD2-SS-1) from the Kek-Gardner centrifugal sifter separation procedure. The slurry was heated to 180° F. (82° C.) and circulated with a Bostonshear pump for 30 min before the slurry was jet cooked at 270° F. (132° C.) and 5.4 bar (78 psig). The jet cooked slurry was circulated through a Kek-Gardner centrifugal sifter with a 100 mesh sieve to remove the insoluble solids. The liquid from the Kek-Gardner was drum dried to give a cream-colored solid Invention Product (DD2-PP1-JC-SL-DD) having a β-glucan content of 20% dwb, a digestible carbohydrate content of 29% dwb, and a starch:β-glucan ratio of 1.40.

Example 2

Oat Bran (OBC), 100 lb (45 kg, QUAKER Oats Company, Chicago, Ill., Lot No. 26629; JUNE 26, 2003) was mixed with 1900 lb (862 kg) of water [8.345 lb/gal or 228 gallons] and heated to 108° F. (42° C.) in a mixing tank and circulated with a Bostonshear pump with a three stage head for 1 hour. The solids were separated using a Kek-Gardner centrifugal sifter with a 200 mesh sieve over the course of about an hour. The resultant wet sieve solids (DD3-SS-1) were saved for the step, below. The liquid (DD3-SL-1) from the Kek-Gardner centrifugal sifter was centrifuged with a WESTFALIA clarifier to separate out the solid particles that had passed through the sieve (DD3-SL-1-CS-1), and the solid particles were discarded. The centrifuge liquid (DD3-SL-CL1) was mixed with the wet solids (DD3-SS-1) from the Kek-Gardner centrifugal sifter separation. The slurry was heated to approximately 200° F. (93° C.) while being circulated through a Bostonshear pump for 60 min. The cooked slurry was jet-cooked at a steam pressure of 5.4 bar (78 psig) to maintain a temperature of 270° F. (132° C.). The hot liquid from the jet cooker was circulated through a Kek-Gardner centrifugal sifter with a 100 mesh sieve (to remove the insoluble materials, DD3-PP3-JC-SS) to give a milky liquid (DD3-PP3-JC-SL). A portion of this liquid was drum dried to give Invention Product (DD3-PP3-JC-SL-DD) having a β-glucan content of 25%, a digestible carbohydrate content of 21% dwb, and a starch to β-glucan ratio of 0.84. The remainder of the milky liquid was returned to a mixing tank and was cooled to less than 40° (104° F.) by storing overnight. This sample was designated DD3-PP4-JC-SL2. The spent oat bran solids that were separated from the sieve were drum dried to yield a by-product (DD3-PP3-JC-SS-DD, Natural Cooked Oat Fiber) comprising about 6-8%, dwb, β-glucan.

Example 3A

The stored milky liquid DD3-PP4-JC-SL2 from Example 2 was blended with ethyl alcohol in the ratio of two parts DD3-PP4-JC-SL2 to one part ethyl alcohol. The mixture was circulated at low shear for one hour, and centrifuged to remove the precipitated product. A first portion of the precipitate was drum dried and was designated Invention Product DD3-PP4-JC-SL2-ETOH-CS-DS-DD having 37% dwb β-glucan, 9% dwb digestible starch, and a starch:β-glucan ratio of 0.24.

Example 3B

A second portion of the precipitate obtained in Example 3A was freeze dried and was designated Invention Product DD3-PP4-JC-SL2-ETOH-CS-DS-FD having 40%, dwb, β-glucan, 10% dwb digestible starch, and a starch:β-glucan ratio of 0.25.

Example 4A

Oat Bran (OBC), 100 lb (45 kg, QUAKER Oats Company, Chicago, Ill.) was ground until all particles passed −20/840μ screen. The ground OBC was mixed with 1900 lb (862 kg) water (8.345 lb/gal or 228 gallons), heated to 108° F. (42° C.) in a mixing tank, and circulated for maximum shear using a three stage shear pump (Bostonshear pump) for 1 hour. The solids were separated using a Kek-Gardner centrifugal sifter with a 200 mesh screen bag recycled continuously for 2 hours. The separated wet sieve solids (DD6-PP6-SS1) were saved in the retaining tank for a later step. Sieved liquid (DD6-PP6-SL1) was centrifuged with a WESTFALIA clarifier to separate out the particles that passed through the sieve. The separated solids (DD6-PP6-CS-1) were discarded. Centrifuge liquid (DD6-PP6-CL1) was mixed with the wet solids (DD6-PP6-SS1) from the initial sieve separation procedure. The slurry was heated to approximately 200° F. (93° C.) while being circulated through the Bostonshear three shear stage pump with maximum shear for 1 hr. The hot slurry was jet-cooked at a steam pressure of 78 psi to maintain a temperature of 270° F. (132° C.), and hot liquid from the jet-cook was circulated through a Kek centrifugal sifter with a 100 mesh sieve (to remove the insoluble materials. A portion of the liquid was drum dried to give Invention Product DD6-PP6-JC-SL-DD having 21.3% dwb β-glucan, 21.6% dwb digestible starch, and a starch:β-glucan ratio of 1.01.

Example 4B

The remaining sieved liquid from Example 4A (DD6-PP6-JC-SL2) was centrifuged through a WESTFALIA clarifier and the centrifuge liquid (DD6-PP6-JC-SL2-CL) was cooled to 60-100° F. (15-37° C.). A first portion of the cooled liquid was drum dried to give Invention Product DD6-PP6-JC-SL3-CL-DD having 31.7% dwb β-glucan, 26.0% dwb digestible starch, and a starch:β-glucan ratio of 0.77.

Example 4C

A second portion of the cooled liquid from Example 4B (DD6-PP6-JC-SL2-CL) was blended with 200 proof ethanol (30% volume/70% volume of cooled DD6-PP6-JC-SL2-CL) with continuous moderate stirring for 30 min and then allowed to stand for 2 hours. The resultant slurry was continuously passed thru the WESTFALIA clarifier to separate out an emulsion that was allowed to settle into a liquid fraction and an insoluble fraction that was freeze-dried to give Invention Product (DD6-PP6-JC-SL2-CL-ETOH-CS1-DS-FD2) having 47.0% dwb β-glucan, 20.6% dwb digestible starch, and a starch:β-glucan ratio of 0.44

Example 5

Hydrocolloidal Pasting Properties Using Rapid Visco-Analyzer (RVA) Measurements

Visco-elastic pasting properties of the hydrocolloidal β-glucan compositions described in Examples 4A, 4B and 4C were determined using a Rapid Visco-Analyzer (RVA-4, Foss North America, Eden Prairie, Minn.) based on a procedure applied to starch compositions. The oat β-glucan hydrocolloids were suspended in water at an 8% w/w level in duplicate for each replicate. These suspensions were prepared by weighing the hydrocolloidal materials (2.24 g on a dry basis) into a RVA canister and making up the total weight to 28 grams with deionized water. The hydrocolloidal suspensions were equilibrated at 30° C. for 1 min, heated at a uniform rate so as to attain 40° C. in 4 min for a first comparison point to display the unique pasting properties of the hydrocolloid compositions of the invention. The complete spectrum of pasting was then continued by heating to 95° C., maintaining that temperature for 5.5 min, and then cooling at a uniform rate to return the temperature to 50° C. Constant paddle rotating speed (160 rpm) was used throughout entire analysis except for a speed of 960 rpm for the first 10 seconds to disperse the hydrocolloid compositions.

TABLE 1

Hydrocolloid Digestible Starch and β-Glucan Contents

| Product | Digestible Starch in Composition, % dwb | β-Glucan in Composition, % dwb | Ratio Starch/β-Glucan |
|---|---|---|---|
| Invention Product DD2-PP1-JC-SL-DD (Ex. 1) | 29 | 20 | 1.4 |
| Invention Product DD3-PP3-JC-SL-DD, (Ex. 2) | 21 | 25 | 0.8 |
| Invention Product DD3-PP4-JC-SL2-ETOH-CS-DS-DD (Ex. 3A) | 9 | 37 | 0.2 |
| Invention Product DD3-PP4-JC-SL2-ETOH-CS-DS-FD, (Ex. 3B) | 10 | 40 | 0.3 |
| Invention Product DD6-PP6-JC-SL-DD, (Ex. 4A) | 22 | 21 | 1.0 |
| Invention Product DD6-PP6-JC-SL3-CL-DD, (Ex. 4B) | 26 | 32 | 0.8 |
| Invention Product DD6-PP6-JC-SL2-CL-ETOH-CS1-DS-FD2, (Ex. 4C) | 21 | 47 | 0.4 |
| Starting Material OBC-VDF-PP1&2 | 41 | 10 | 4.1 |
| Prior Art Product Nutrim-OB-VDF (from same starting material as above, U.S. Pat. No. 6,060,519) | 56 | 10 | 5.6 |

I claim:

1. A method for preparing a thermo-sheared soluble hydrocolloid comprising a ratio of digestible, Starch to β-glucan soluble fiber in the range of 0.1-2.0, wherein, said digestible starch is gelatinized and the β-glucan consists essentially of solubilized β-glucan, the method comprising the steps:
    a. subjecting a first aqueous slurry of a cereal substrate to a temperature in the range of about 20-60° C. under conditions of shear sufficient to disrupt the cellular structure of said substrate, thereby yielding a sheared, second aqueous slurry;
    b. separating the sheared, second aqueous slurry resulting from (a) into a first liquid fraction comprising starch and a first solid fraction comprising fiber;
    c. separating starch from said first liquid fraction to yield a starch-depleted liquid;
    d. recombining said starch-depleted liquid with said first solid fraction to yield a third aqueous slurry; and
    e. subjecting said third aqueous slurry to conditions of shearing at elevated temperature to produce a fourth aqueous slurry and recovering said hydrocolloid from said fourth aqueous slurry.

2. The method of claim 1, wherein said separating in step (b) is conducted by wet filtration using a screen pore opening in the range of 0.21-0.025 mm and a force selected from vibrational, centrifugal, and a combination of vibrational and centrifugal.

3. The method of claim 1, wherein said conditions of shearing and elevated temperature are provided by jet-cooking.

4. The method of claim 1, wherein said elevated temperature is in the range of 120-150° C.

5. The method of claim 1, wherein said recovering in step (e) further comprises separating said fourth aqueous slurry into a second liquid fraction and a second solid fraction, and recovering said hydrocolloid from said second liquid fraction.

6. The method of claim 5, wherein said separating of said fourth aqueous slurry is by wet filtration using a pore opening between 0.21 and 0.025 mm and a force selected from vibrational, centrifugal, and a combination of vibrational and centrifugal.

7. The method of claim 5, wherein said recovering in step (e) further comprises centrifuging said second liquid fraction into a third liquid fraction and a third solid fraction, and further recovering said hydrocolloid from said third liquid fraction.

8. The method of claim 5, wherein said recovering in step (e) further comprises precipitating said hydrocolloid from said second liquid fraction with a hydrophilic liquid.

9. The method of claim 7, wherein said recovering in step (e) further comprises precipitating said hydrocolloid from said third liquid fraction with a hydrophilic liquid.

10. The method of claim 1, wherein said recovering in step (e) further comprises drying a liquid fraction separated from said fourth aqueous slurry.

11. The method of claim 10, wherein said drying is selected from the group consisting of drum drying and freeze drying.

12. The method of claim 1, wherein said cereal substrate is selected from the group consisting of oat flour, oat bran, barley flour and mixture thereof.

13. The method of claim 1, wherein said steps are effective to produce said hydrocolloid being characterized by a pasting property wherein an 8% w/w aqueous suspension of said hydrocolloid is characterized by a viscosity greater than 1000 centipoises at 40° C. when initially heated.

14. The method of claim 13, wherein said viscosity is greater than 2000 centipoises at 40° C. when initially heated.

15. The method of claim 13, wherein said viscosity is greater than 2500 centipoises at 40° C. when initially heated.

16. The method of claim 13, wherein said viscosity is approximately 4000 centipoise at 40° C. when initially heated.

17. The method of claim 1, wherein said hydrocolloid is characterized by a gelatinized starch content of less than 30% on a dry weight basis.

18. The method of claim 13, wherein said hydrocolloid is further characterized by a β-glucan content of at least about 20% on a dry weight basis.

* * * * *